United States Patent
Gorti et al.

(10) Patent No.: US 8,046,417 B2
(45) Date of Patent: Oct. 25, 2011

(54) SYSTEM AND METHOD FOR QUALITY OF PRESENCE

(75) Inventors: Sreenivasa Gorti, Austin, TX (US); Robert Henry, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 141 days.

(21) Appl. No.: 12/464,405

(22) Filed: May 12, 2009

(65) Prior Publication Data

US 2010/0293231 A1  Nov. 18, 2010

(51) Int. Cl.
G06F 15/16 (2006.01)

(52) U.S. Cl. .................. 709/206; 709/207

(58) Field of Classification Search .............. 709/203, 709/206, 207
See application file for complete search history.

(56) References Cited

U.S. PATENT DOCUMENTS

| | | | |
|---|---|---|---|
| 5,649,105 A | 7/1997 | Aldred et al. | |
| 5,742,905 A | 4/1998 | Pepe et al. | |
| 5,991,645 A | 11/1999 | Yuen et al. | |
| 6,757,722 B2 | 6/2004 | Lonnfors et al. | |
| 6,807,423 B1 | 10/2004 | Armstrong et al. | |
| 6,853,634 B1 | 2/2005 | Davies et al. | |
| 7,010,292 B2 * | 3/2006 | Jerbi et al. | 455/414.1 |
| 7,058,387 B2 | 6/2006 | Kumar et al. | |
| 7,379,461 B2 | 5/2008 | Wu et al. | |
| 2004/0249910 A1 | 12/2004 | Jerbi et al. | |
| 2005/0232184 A1 | 10/2005 | Borella | |
| 2005/0262195 A1 | 11/2005 | Ono et al. | |
| 2006/0047782 A1 | 3/2006 | Niemi | |
| 2006/0070003 A1 | 3/2006 | Thompson et al. | |
| 2006/0215633 A1 | 9/2006 | Jennings et al. | |
| 2006/0256731 A1 | 11/2006 | Jennings et al. | |
| 2006/0258332 A1 | 11/2006 | Jennings et al. | |
| 2006/0259958 A1 | 11/2006 | Jennings et al. | |
| 2008/0183866 A1 | 7/2008 | Maeda et al. | |
| 2008/0291896 A1 * | 11/2008 | Tuubel et al. | 370/352 |
| 2009/0070431 A1 * | 3/2009 | Malik et al. | 709/206 |
| 2009/0147771 A1 * | 6/2009 | Seal et al. | 370/352 |

* cited by examiner

Primary Examiner — Kristie D Shingles
(74) Attorney, Agent, or Firm — Andrew Gust; Guntin Meles & Gust, PLC

(57) ABSTRACT

A rating of the quality of the presence information of a user at a communication device is determined by an aggregation client by determining a direct indicator of presence of a user at the communication device, determining a presence likelihood at the communication device, determining a time delay characteristic related to input on the communication device, and determining a quality of presence rating based on these factors. A graphical or numerical indication of the quality of presence rating is sent to other users' communications devices.

19 Claims, 4 Drawing Sheets

SYSTEM AND METHOD FOR QUALITY OF PRESENCE

BACKGROUND OF THE INVENTION

The present invention relates generally to presence detection and more particularly to establishing presence ratings.

In computer and telecommunications networks, "presence" is a status indicator that conveys ability and willingness of a potential communication partner (e.g., a user of a communication device) to communicate. A user's communication device provides presence information (e.g., a presence state) to appropriate presence information outlets. This information can be made available for distribution to other users to convey the availability for communication. Presence information has wide application in many communication services, specifically instant messaging, mobile and wired telephone systems, conference services, voice over IP (VOIP), and other collaboration applications.

Presence Incorporating Systems (PIS) provide presences status information related to users of such systems. The system displays or otherwise provides presence information to other users. A user communication device (e.g., via client) may publish a presence state to indicate its current communication status. This published state informs other users that wish to interact with the user of the availability and willingness to communicate. The most common use of presence is to display an indicator icon on instant messaging clients, typically from a choice of graphic symbol with an easy-to-convey meaning and a list of corresponding text descriptions of each of the states.

Exemplary presence states include "free for chat", "busy", "away", "do not disturb", "out to lunch", user defined text or images, etc. Generally, these are "explicit" presence states. That is, they are set by a user and are static until an alternate state is set, until the user's client is powered down, or until another predetermined condition is met (e.g., expiration of a time limit, etc.).

Additionally and/or alternatively, "implicit" presence states are used. Implicit presence states are states that are not set by the user, but are determined by some other means—generally determined based on use or disuse of a particular user device. For example, a user state may be automatically set to "available" as soon as the client is started and may again be automatically set to "away" when the client is unused for a predetermined period of time.

The use of explicit presence information is unreliable because a user may forget to change or update status information. The use of implicit presence information is unreliable because the time-based updating of presence information does not account for modern usage of multiple devices.

Accordingly, improved systems and methods for presence information generation are required.

BRIEF SUMMARY OF THE INVENTION

The present invention generally provides methods for rating the quality of the presence information of a user at a communication device. This rating is determined by an aggregation client by determining a direct indicator of presence of a user at the communication device, determining a presence likelihood at the communication device, determining a time delay characteristic related to input on the communication device, and determining a quality of presence rating based on these factors. A graphical or numerical indication of the quality of presence rating is sent to other users' communications devices.

These and other advantages of the invention will be apparent to those of ordinary skill in the art by reference to the following detailed description and the accompanying drawings.

DETAILED DESCRIPTION

Presence is used in communications applications to allow users to determine if a particular user is online (e.g., connected to a networking system) and available to be contacted (e.g., not "busy," "away," etc.). As discussed above, prior presence systems do not adequately address the quality of such presence. Described below are exemplary embodiments of improved systems and methods for determining and reporting quality of presence.

A quality of presence rating (QPR) is used by one or more PIS to provide presence status information. The QPR provides an approximation of the accuracy of the presence information that is provided by the PIS.

Figure 1:
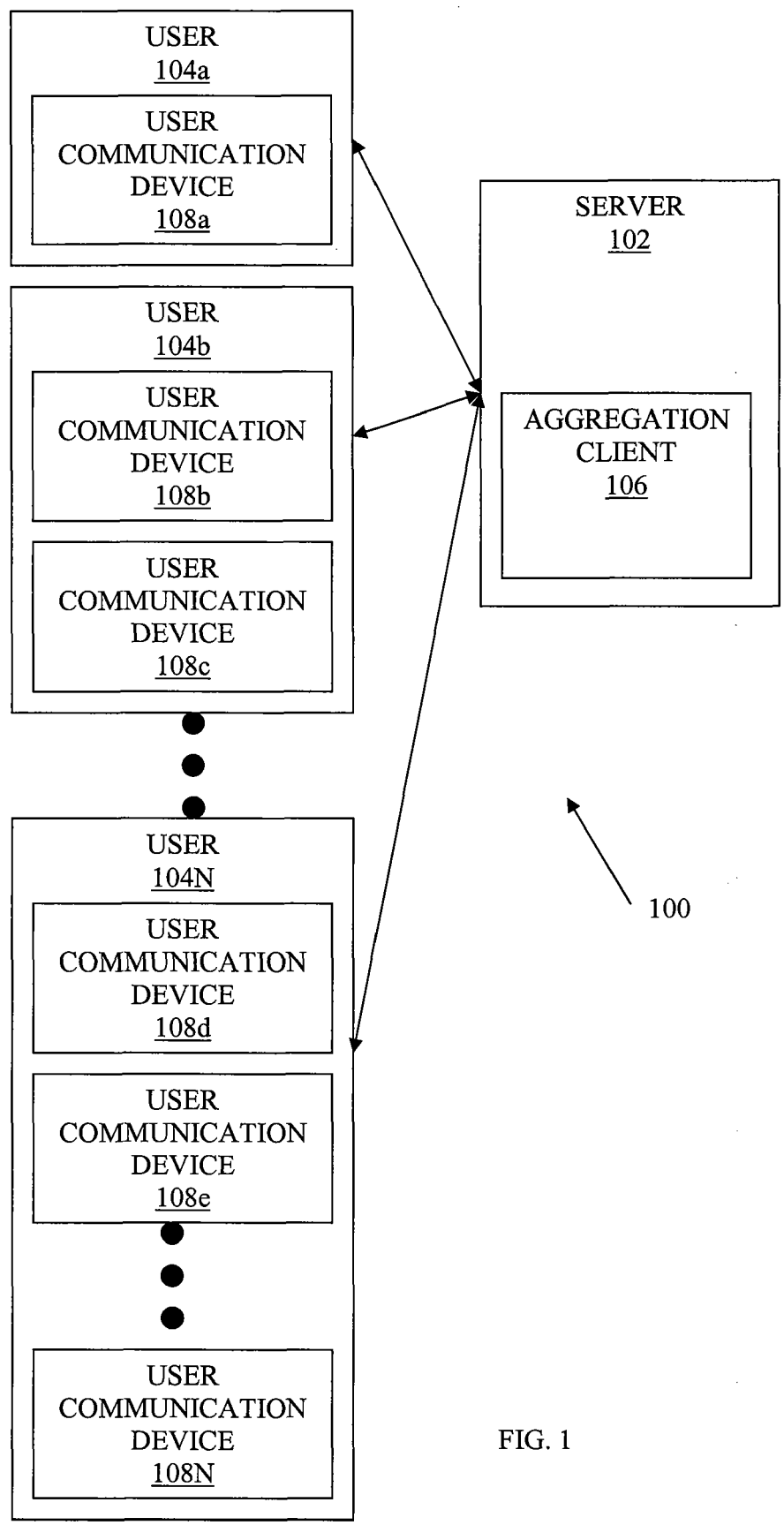
FIG. 1 depicts a presence aggregation system according to an embodiment of the present invention.

FIG. 1 depicts a presence aggregation system 100 according to an embodiment of the present invention. Presence aggregation system 100 includes a presence information server 102 in communication with one or more users 104a-N. In at least one embodiment, server 102 includes an aggregation client 106. In the same or alternative embodiments, users 104a-N are in communication with and/or have control over one or more user communication devices 108a-N. As described herein, "in communication with" describes connection between components (e.g., server 102, users 104a-N, communication devices 108a-N, etc.) that can transmit signals and/or information to each other using any appropriate protocol and combination of wired and/or wireless communication techniques (e.g., Bluetooth, VOIP, wired, IP, etc.).

Presence aggregation system 100 is or incorporates at least portions of various communications networks such as next-generation IP multimedia subsystem (IMS) infrastructure, 2G home location register (HLR) networks, instant messaging systems, data applications (e.g., collaboration, calendaring, workforce management, etc.), private branch exchange (PBX)-like systems (e.g., premises PBX, hosted PBX, IP Centrex, call center systems, etc.), internet protocol television systems, detector-based systems (e.g., radio-frequency identification (RFID), Bluetooth, etc.), and the like. That is, one or more of communications devices 108a-N may access or otherwise use such networks to provide and/or receive presence information from server 102.

Server 102 is any appropriate server or server-like device or devices that can send and receive information from user communication devices 108a-N. Server 102 may be implemented as a controller, such as the controller 300 discussed below with respect to FIG. 3. That is, server 102 may include and/or be a controller adapted to perform the methods described below with respect to FIG. 4.

Aggregation client 106 is a particular component or group of components of server 102 and is a controller, processor, or like computer device that is specifically configured to perform presence aggregation and processing functions. More specifically, aggregation client 106 is adapted to perform the methods described below with respect to FIG. 3.

Communication devices 108a-N are any appropriate devices used for electronic communication. For example, communication devices 108a-N may be personal computers, mobile telephones, cellular telephone devices, handheld device, handheld computers, personal digital assistants (PDAs), smartphones, and other mobile devices. Each communication device 108a-N utilizes a PIS, as described above. That is, each communication device 108a-N uses a system that determines presence status information and provides that information to other users, presence incorporating systems, or the like.

Additionally, communication devices 108a-N each have an indicator display (not shown). The indicator displays provide a graphical or otherwise perceivable indication of the QPR, presence information, or related information.

Users 104a-N each have one or more communication devices 108a-N. That is, a user may have access to and/or the ability to use many communication devices 108a-N. For example, a user 104N may have access to a first communication device 108d, such as a personal computer, a second communication device 108e, such as a mobile telephone, and a third communication device 108N, such as a WiFi enabled handheld device.

Figure 2:
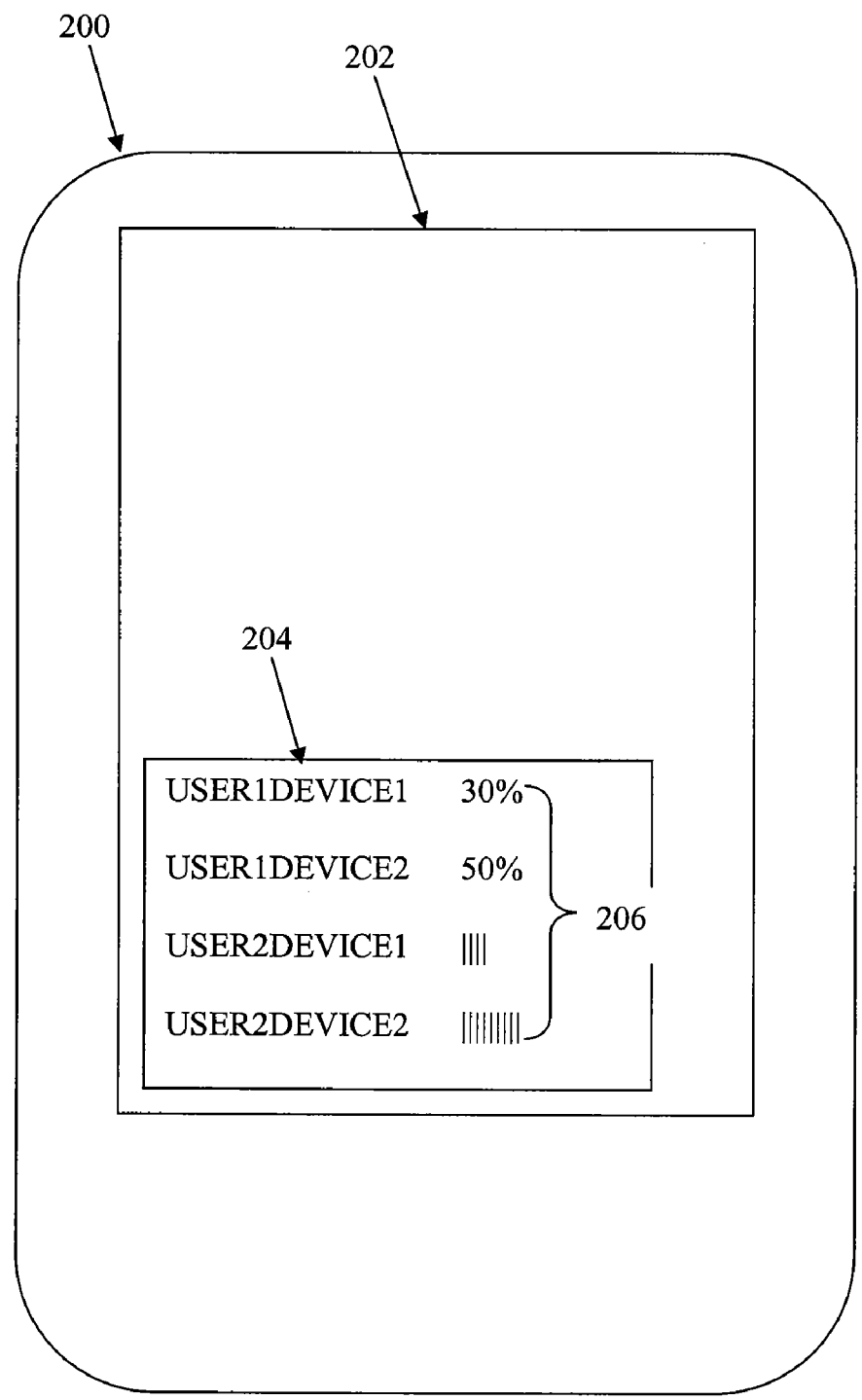
FIG. 2 is a schematic drawing of a user communication device according to an embodiment of the present invention.

FIG. 2 is a schematic drawing of a user communication device 200 according to an embodiment of the present invention. Use of user communication device 200 is described in further detail below with respect to FIG. 4.

User communication device 200 may be used as a communication device 108a-N as described above with respect to FIG. 1. User communication device 200 has an indicator display 202. The indicator display 202 provides a graphical or otherwise perceivable indication of the QPR, presence information, or related information. A PIS displays a graphic indication of a QPR and/or related information in indicator display 202. In the example of FIG. 2, the presence information for two users—USER1 and USER2—is displayed in a presence information region 204 of display 202. Presence information region 204 may be incorporated into any appropriate visual indication of users' presence information. For example, in an instant messaging IM client, a user's friends (e.g., USER1 and USER2) are displayed so that the user may know the availability of these friends for IM or other communications.

The presence information region 204 may display the presence information for multiple devices for each user. In the example of FIG. 2, each of USER1 and USER2 is associated with two devices, indicated as USER1 DEVICE1/USER1 DEVICE2 and USER2DEVICE1/USER2DEVICE2. For example, USER1 may be associated with a personal computer (e.g., DEVICE1) and a mobile telephone (e.g., DEVICE2). Similarly, USER2 may be associated with a WiFi enabled handheld device (e.g., DEVICE1) and a mobile telephone (e.g., DEVICE2). In this way, user communication device 200 displays information about both users and their respective devices in presence information region 204.

Presence information region 204 displays along with each device an indication related to QPR in a QPR region 206. Such an indication can be a percentage rating, as shown associated with USER1DEVICE1 and USER1DEVICE2, a graphical scale, as shown associated with USER2DEVICE1 and USER2DEVICE2, a thermometer-type icon, a colored icon (e.g., a red, yellow, or green "stoplight" style icon), or any other appropriate visual indicator of the QPR-related information. As will be discussed further below with respect to FIG. 4, the information displayed in QPR region 206 is expressed using a standard rating scale. The range of the scale is the same across different PIS. This allows consistent and direct comparison of a particular user's QPR on different devices. In the example shown in FIG. 2, USER1's DEVICE2 has a higher percentage QPR. Thus, it is more likely that USER1 is available to be contacted on DEVICE2 than DEVICE1. As seen in the "percentage rating" type scale used for USER1, there is some likelihood (20%) that the user will not be available on either device. This will be discussed further below with respect to FIG. 4.

In at least one embodiment, an integrated presence system (e.g., aggregation client 106 of FIG. 1) collects QPR information from each device associated with a particular target user or PIS and determines an aggregate QPR. This aggregated QPR would be an indication of the likelihood of reaching the targeted user at any of the devices under their control.

Figure 3:
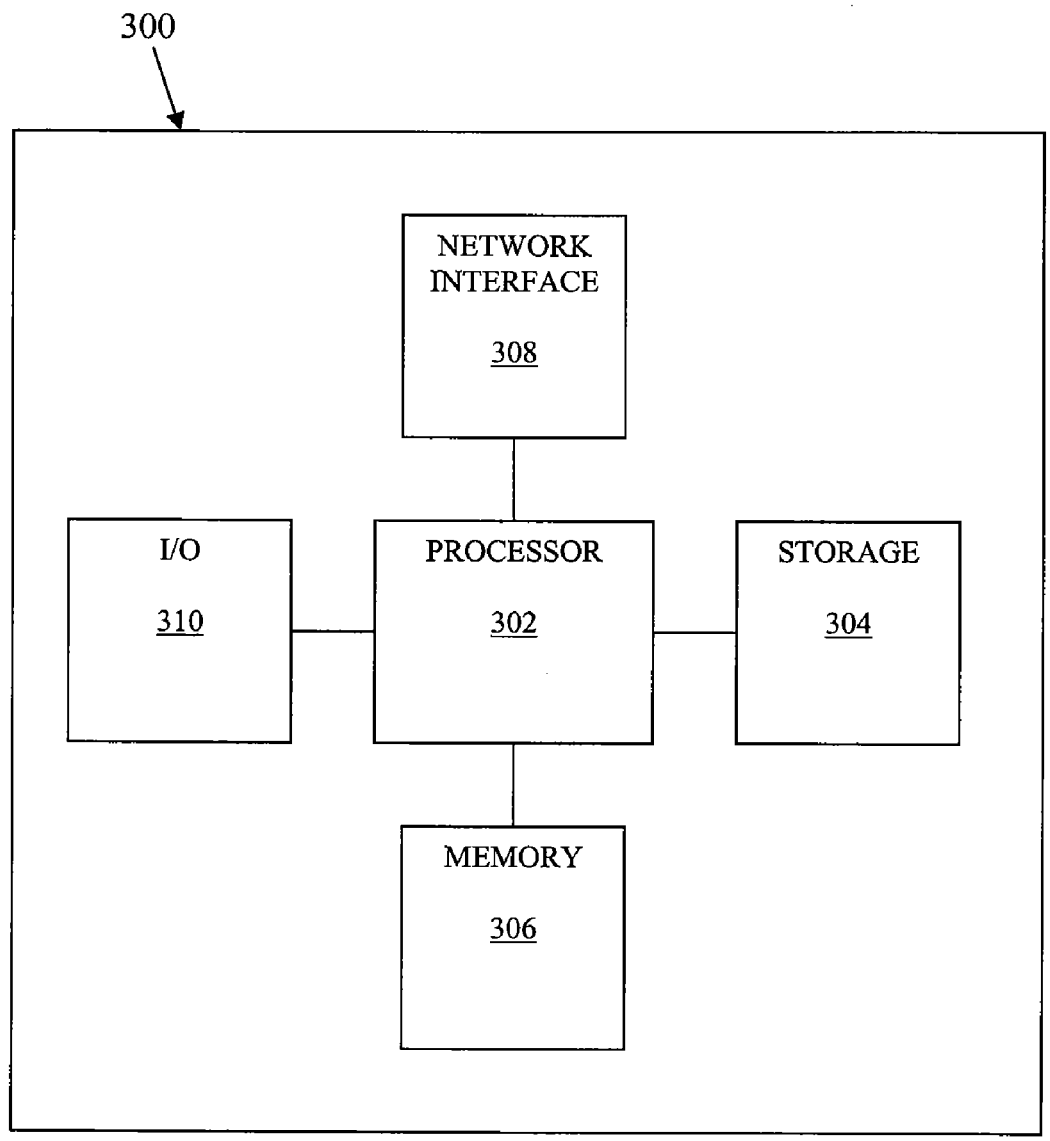
FIG. 3 is a schematic drawing of a controller.

FIG. 3 is a schematic drawing of a controller 300 according to an embodiment of the present invention.

Controller 300 contains devices that form a controller including a processor 302 that controls the overall operation of the controller 300 by executing computer program instructions, which define such operation. The computer program instructions may be stored in a storage device 304 (e.g., magnetic disk, database, etc.) and loaded into memory 306 when execution of the computer program instructions is desired. Thus, applications for performing the herein-described method steps, such as those described below with respect to method 400 are defined by the computer program instructions stored in the memory 306 and/or storage 304 and controlled by the processor 302 executing the computer program instructions. The controller 300 may also include one or more network interfaces 308 for communicating with other devices via a network (e.g., transcoding system 100). The controller 300 also includes input/output devices 310 that enable operator interaction with the controller 300. Controller 300 and/or processor 302 may include one or more central processing units, read only memory (ROM) devices and/or random access memory (RAM) devices. One skilled in the art will recognize that an implementation of an actual computer for use in a portable communication device could contain other components as well, and that the controller of FIG. 3 is a high level representation of some of the components of such a portable communication device for illustrative purposes.

According to some embodiments of the present invention, instructions of a program (e.g., controller software) may be read into memory 306, such as from a ROM device to a RAM device or from a LAN adapter to a RAM device. Execution of sequences of the instructions in the program may cause the controller 300 to perform one or more of the method steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software. The memory 306 may store the software for the controller 300, which may be adapted to execute the software program and thereby operate in accordance with the present invention and particularly in accordance with the methods described in detail below. However, it would be understood by one of ordinary skill in the art that the invention as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general purpose program elements are known to those skilled in the art, and need not be described in detail herein.

Figure 4:
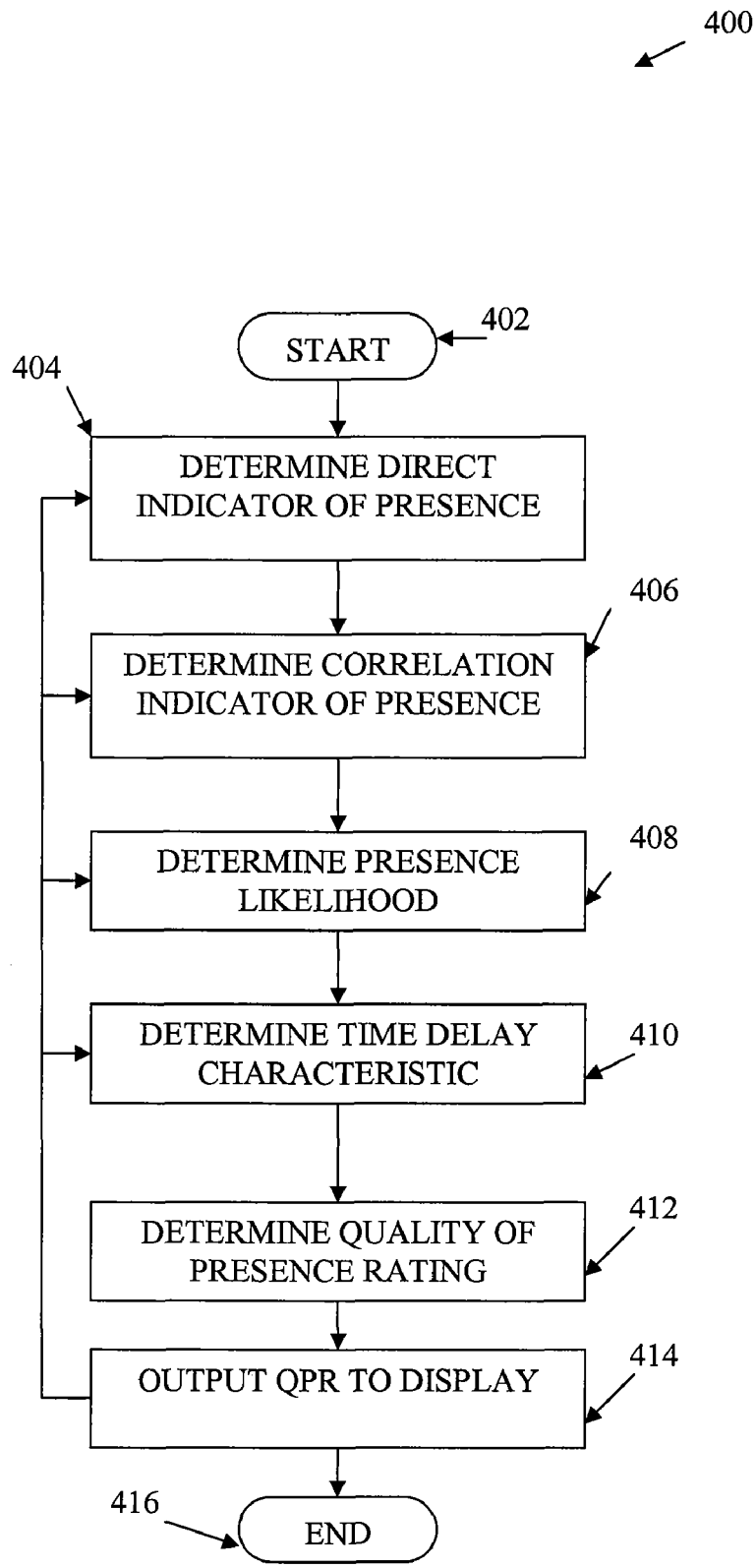
FIG. 4 is a flowchart of a method of determining a quality of presence rating according to an embodiment of the present invention.

FIG. 4 is a flowchart of a method 400 of determining a QPR according to an embodiment of the present invention. In at least one embodiment, method 400 is performed by aggregation client 106 of FIG. 1, which is particularly programmed to perform the method steps described herein. The method 400 starts at step 402.

In step 404, a direct indicator of presence (DIP) is determined. A DIP is determined by the PIS for each device 108a-N. In at least one embodiment, the DIP is the primary determinant of the QPR. The DIP is an event or user action that directly indicates that the user is present. Generally, DIP detection and reporting is performed by application and/or system software of the PIS without user intervention. Additionally and/or alternatively, automated DIP detection and reporting may be accomplished by other components of presence aggregation system 100 and/or devices 108a-N. For a voice capable communication device, an exemplary DIP is the user being on an active call, whether originated or received by that user. For a messaging capable device, the user sending a message would be a DIP. Other examples of DIP detection can be associated with many applications of communications devices which require active user engagement.

In an alternative embodiment, DIP is determined based on a manual trigger by a user 104a-N. For example, a user 104a-N may update an IM status or may otherwise provide indication of the availability of the device currently being used or another device. In another example, an outside user (e.g., a user's assistant) updates the user's status using a portal interface.

In step 406, a correlated indicator of presence (CIP) is determined. The CIP is an attribute or supplemental indicator associated with the communication device 108a-N. An exemplary CIP for a device attribute could be the fact that the communication device is in motion, which is detectable by various existing methods. Regardless of motion, detecting the location of the communication device as being in the user's home or office is another attribute CIP example. An example of a supplemental CIP would be user activity on one communication device in a location (e.g., home, office, etc.) where the user has other active communication devices. For example, if a user is engaged in text messaging or a data application on one device then that is a supplemental CIP for a telephone or other devices active at that location.

Generally, CIP detection and reporting is performed by application and/or system software of the PIS without user intervention. Additionally and/or alternatively, automated CIP detection and reporting may be accomplished by other components of presence aggregation system 100 and/or devices 108a-N. In some instances no CIP may be currently detected for a specific device. In some embodiments CIP is determined as part of the DIP described above in step 404. In alternative embodiments CIP determination is supplemental to the DIP determination. For example, CIP may be determined based on continued usage of a device 108a-N (e.g., typing, device movement, GPS information, etc.).

In these ways, CIP is used to modulate the perceived quality of users' presence information associated with DIPs. CIP is an input factor that is used as part of step 412 in determining the QPR. Generally, it increases the QPR beyond the level indicated by the DIP for the communications device being rated. A CIP augments the presence likelihood value (of step 408) and/or indicates the renewal or reset of the time delay characteristic (of step 410) to result in a higher QPR (in step 412).

In step 408, a presence likelihood (PL) is determined. PL is a quality valued assigned to each indicator of presence. The PL of a communications device 108a-N is the probability that a DIP or CIP is correctly representing the ability of the user 104a-N to access the device. In at least one embodiment, the PL is a fixed value for a particular PIS or communications device 108a-N. In this way, the PL value accounts for various types of usage of a device and how that usage might provide a strong indication that a user has access to the used device. For example, making a telephone call on a mobile phone is a very strong indicator that the user is available for a voice communication on that device than for communication via IM.

In step 410, a time delay characteristic (TDC) is determined. TDC is a decay adjustment based at least in part on the time since the last usage of a device. In this way, the TDC reflects the diminished quality of the accuracy of the QPR over time. The TDC is a predetermined time function. In some embodiments, the time function is linear and related to the elapsed time since an input is received at a device 108a-N. For example, a linear function may be used in a TDC related to the amount of time since a keyboard was used on a user's communication device 108a-N. In alternative embodiments, the TDC is a non-linear decay function. For example, the TDC may decay shallowly for a short time after a voice telephone call is made, but then may decay sharply after that predetermined time. In another example, the TDC is an adjustment based on the time of day or other environmental factors specific to a PIS and/or communication device 108a-N. In at least one embodiment, a separate TDC is associated with each DIP and/or CIP in the PIS.

In step 412, a quality of presence rating is determined. The QPR is determined base at least in part on the DIP, the CIP, the PL, and the TDC. That is, the QPR is an aggregate approximation determined (e.g., by the aggregation client 106 of FIG. 1) base on multiple sources of input. In this way, the QPR is an approximate measurement of the likelihood of a user 104a-N being available to interact via a particular communication device 108a-N.

For example, in the examples described above with respect to FIGS. 1 and 2, the user 104b has a first communication device 108b, which is a personal computer and a second communication device 108c, which is a mobile telephone. To determine a QPR in step 412, the preceding method steps of method 400 are performed. For purposes of illustration, the user 104b in this example is also referred to as USER2 in the discussion and depiction of FIG. 2, with device 108b referred to as DEVICE1 and device 108c referred to as DEVICE2.

The method for determining the QPR for DEVICE1 first identifies the DIP—using the QWERTY keypad of the personal computer—in step 404. In this example no CIP is detected in step 406. A value for PL is determined in step 408—in this example a fixed value of 1.0 for keypad typing on a personal computer. At step 410, the TDC is determined. Here, if USER2 has not typed on DEVICE1 for the past 30 minutes, but it is still within defined business hours, the TDC value is determined to be 0.4 for example. As discussed above, a linear decay based on elapsed time since last use is appropriate for a typing input. Using these values in step 412, the QPR for DEVICE1 is determined to be 0.4—relatively low in this example.

The method for determining the QPR for DEVICE2 first identifies the DIP in step 404—recently making a voice call on the mobile phone. In this example USER2 is in motion with the mobile phone, so a CIP is determined in step 406. A value for PL is determined in step 408—in this example a value of 1.0 due to the DIP being a voice call. The TDC determined at step 410 for DEVICE2 is 0.75 in this example, since the call was made 15 minutes ago. Using these values and the CIP indicating DEVICE2 is in motion, then at step 412 the QPR for DEVICE2 is determined to be 0.9—relatively high in this example.

Of course, this is just one example of the myriad inputs and calculations that could be performed to determine QPR. Such inputs could include using an input method of a device (e.g., a keypad, a microphone, a keyboard, etc.), a duration since the last use of a device, a particular time period of likely use (e.g., business hours, weekends, etc.), a location transmission (e.g., via GPS, triangulation, etc.), or the like.

In step 414, the QPR is output to a display at one or more users' communication devices 108a-N. That is, a communications device 108a-N is particularly configured to display a representation of the determined QPR. As discussed above, this display may be a graphic, number, or other visual representation. Continuing the above QPR example, a representation of USER2's QPR is output to the presence information region 204 of communication device 200. DEVICE1's QPR is shown as relatively low, while DEVICE2's QPR is relatively high.

The method ends at step 416. Of course, the method 400 could return control to a previous step after outputting the QPR in step 414. In other words, if any of the DIP, CIP, PL, or TDC are updated (e.g., by the user using another device, using the device again, powering off a device, etc.), the method 400 may be rerun in whole or in part to determine a new QPR in step 412 and output that QPR in step 414.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
    obtaining information associated with a group of communication devices, wherein the information is obtained by a processor;
    determining a direct indicator of presence for the group of communication devices based on the information;
    determining a presence likelihood for the group of communication devices based on the information;
    determining a time delay characteristic for the group of communication devices based on the information, wherein the time delay characteristic comprises a decay adjustment based on a time of last usage of each communication device of the group of communication devices;
    determining a quality of presence rating for the group of communication devices based on the direct indicator of presence, the presence likelihood and the time delay characteristic; and
    providing an indication of the quality of presence rating for the group of communication devices to a display device;
    wherein the indication of the quality of presence rating is presented as a graphical representation of the indication.

2. The method of claim 1 further comprising:
    determining a correlated indicator of presence for the group of communication devices based at least in part on attributes associated with the direct indicator of presence and
    determining the quality of presence rating for the group of communication devices based on the direct indicator of presence, the correlated indicator of presence, the presence likelihood and the time delay characteristic.

3. The method of claim 1 further comprising:
    determining a supplemental correlated indicator of presence for the group of communication devices based on a direct indicator of presence for another device associated with a single user.

4. The method of claim 1 wherein the time delay characteristic is a linear decay function.

5. The method of claim 1 wherein the time delay characteristic is a non-linear decay function.

6. The method of claim 1 further comprising:
    updating the determined quality of presence rating based at least in part on an updated direct indicator of presence.

7. The method of claim 1 wherein the indication of the quality of presence rating is presented as a numerical representation of the indication on a user communication device.

8. A non-transitory computer readable medium comprising computer program instructions capable of being executed in a processor, the computer program instructions comprising code at least for:
    obtaining information associated with a group of communication devices;
    determining a direct indicator of presence for the group of communication devices based on the information;
    determining a presence likelihood for the group of communication devices based on the information;
    determining a time delay characteristic for the group of communication devices based on the information, wherein the time delay characteristic comprises a decay adjustment based on a time of last usage of each communication device of the group of communication devices;
    determining a quality of presence rating for the group of communication devices based on the direct indicator of presence, the presence likelihood and the time delay characteristic; and
    providing an indication of the quality of presence rating for the group of communication devices to a presentation device for outputting the indication of the quality of presence rating;
    wherein the indication of the quality of presence rating is presented as a graphical representation of the indication.

9. The non-transitory computer readable medium of claim 8 wherein the instructions further comprise code at least for:
    determining a correlated indicator of presence for the group of communication devices based at least in part on attributes associated with the direct indicator of presence; and
    determining the quality of presence rating for the group of communication devices based on the direct indicator of presence, the correlated indicator of presence, the presence likelihood and the time delay characteristic.

10. The non-transitory computer readable medium of claim 8 wherein the determining of the time delay characteristic is based on a linear decay function.

11. The non-transitory computer readable medium of claim 8 wherein the instructions further comprise code at least for:
    determining a supplemental correlated indicator of presence for the group of communication devices based on a direct indicator of presence for another device associated with a single user.

12. The non-transitory computer readable medium of claim 8 wherein the determining of for the time delay characteristic is based on a non-linear decay function.

13. The non-transitory computer readable medium of claim 8 wherein the instructions further comprise code at least for:
    updating the determined quality of presence function for the group of communication devices based at least in part on an updated direct indicator of presence.

14. The non-transitory computer readable medium of claim 8 wherein the outputting of the indication of the quality of presence rating comprises outputting a numerical representation of the indication.

15. A system for providing a quality of presence rating, the system comprising:
    a memory comprising computer instructions; and
    a controller executing the computer instructions at least for;
    obtaining information associated with a group of communication devices;
    determining a direct indicator of presence for the group of communication devices based on the information;
    determining a presence likelihood for the group of communication devices based on the information;
    determining a time delay characteristic for the group of communication devices based on the information, wherein the time delay characteristic comprises a decay adjustment based on a time of last usage of each communication device of the group of communication devices;
    determining a quality of presence rating for the group of communication devices based on the direct indicator of presence, the presence likelihood and the time delay characteristic; and
    providing an indication of the quality of presence rating for the group of communication devices to a presentation device for outputting the indication of the quality of presence rating display device;
    wherein the indication of the quality of presence rating is presented as a graphical representation of the indication.

16. The system of claim 15 further comprising computer instructions at least for:
    determining a correlated indicator of presence for the group of communication devices based at least in part on attributes associated with the direct indicator of presence; and
    determining the quality of presence rating for the group of communication devices based on the direct indicator of presence, the correlated indicator of presence, the presence likelihood and the time delay characteristic.

17. The system of claim 15 further comprising computer instructions at least for: updating the determined quality of presence function for the group of communication devices based at least in part on an updated direct indicator of presence.

18. The system of claim 15 further comprising computer instructions at least for:
    determining a supplemental correlated indicator of presence for the group of communication devices based on a direct indicator of presence for another device associated with a single user.

19. The system of claim 15 wherein the outputting of the indication of the quality of presence rating to a quality of presence rating display device comprises outputting a numerical representation of the indication.

* * * * *